United States Patent [19]
Cheng

[11] Patent Number: 5,950,962
[45] Date of Patent: Sep. 14, 1999

[54] WINDING REEL ASSEMBLY WITH DETACHABLE DISKS

[76] Inventor: Lai Chun Cheng, No. 12-5, Chung Po Jiao, Da Teh, Tao Yuan Hsien, Taiwan

[21] Appl. No.: 09/066,765

[22] Filed: Apr. 28, 1998

[51] Int. Cl.[6] .................................................. B65H 75/14
[52] U.S. Cl. .................................... 242/608.5; 242/608.6
[58] Field of Search ............................. 242/608.6, 608.5, 242/609, 609.1, 609.3, 118.61

[56] References Cited

U.S. PATENT DOCUMENTS

| | | |
|---|---|---|
| 4,289,282 | 9/1981 | Kohno . |
| 4,473,194 | 9/1984 | Kashimura . |
| 5,114,089 | 5/1992 | Posso . |

*Primary Examiner*—Donald P. Walsh
*Assistant Examiner*—William A. Rivera
*Attorney, Agent, or Firm*—Bacon & Thomas, PLLC

[57] ABSTRACT

A winding reel assembly comprising a pair of disks and a connecting shaft disposed between the disks. One surface of the disk is provided with a plurality of recessed portions that are arranged circumferentially. The recessed portions define a plurality of embossed portions at the opposite surface of the disk. The side portion of each recessed portion is provided with a through hole that reaches to the embossed portion. The bottom of the recessed portion is provided with a retaining slot. Each end surface of the connecting shaft is provided with a plurality of dowel inserts that are arranged circumferentially. A ratchet hooker is disposed at one of the dowel inserts such that when that dowel insert is aligned with the through hole, the ratchet hooker can be engaged with the retaining slot of the disk after the disks are rotated with respect to the connecting shaft.

1 Claim, 3 Drawing Sheets

WINDING REEL ASSEMBLY WITH DETACHABLE DISKS

FIELD OF THE INVENTION

The present invention relates to a winding reel, more particularly, to a winding reel assembly that can be readily assembled or disassembled.

DESCRIPTION OF PRIOR ART

In existing practice, the configuring parts that are connected one-by-one are wound on a reel for storage as well as supplying during the assembling work. For example, magnetic tape is wound on a reel and then it is extended for further processing. On the other hand, the connectors, IC parts are all first attached to a carrying band and then wound up onto a winding reel to form a component roll. When those components are to be assembled, they shall be firstly unfolded by a suitable machine and are then supplied to the processing equipment.

The conventional winding reel is generally configured by a pair of disks and a connecting shaft that is disposed between those two disks. A storing space will be defined between those disks to receive and wind the component strip. The connection between the disks and the connecting shaft is facilitated by 1) providing a plurality of retaining slots on the end surface of the connecting shaft; and 2) providing a plurality of ratchet hookers on the disks respective to the retaining slots. Accordingly, when the ratchet hookers are inserted into the retaining slots, the disks and the connecting shaft can be assembled together. Consequently, the conventional winding wheel is configured to wind up the component strip. In the existing practice, those configuring components are all made from plastic material.

Nevertheless, during the assembling work, the winding reel could be dropped onto the floor accidentally. In this case, the engagement between the retaining slots and ratchet hookers will be broken such that the overall component strip that has been wound will scatter around. This occurs often to ratchet hookers that are made from plastic material.

On the other hand, because of the job requirements, a single winding reel is required to wind up a plurality of different component strips. Besides, the existing winding reel shall repeatedly disassemble the disk from the connecting shaft to attach a new component strip thereto: Nevertheless, the conventional hooker-slot engagement is laborious and cost a great deal of time in both assembling and disassembling. Consequently, there is a need to suggest an improvement.

In another conventional winding reel, the disks and the connecting shaft are firmly and permanently connected with each other by means of ultra-sonic melding. When the component strip is wound up thereon, the disks and connecting shaft can not be separated from each other. As a result, it is bulky and costly. In light of this, there is a need to provide an improved winding reel.

SUMMARY OF THE INVENTION

It is the objective of this invention to provide a winding reel assembly in which the engagement between the disks and the connecting shaft is facilitated by rotational engagement that is tough and durable for sustaining any external impact, such as dropping down to the floor. Accordingly, the component roll wound therein will not be scattered around even when the winding reel assembly is dropped to the floor.

It is still the objective of this invention to provide a winding reel assembly in which a plurality of dowel inserts is served as an alignment between the disks and the connecting shaft. On the other hand, only one ratchet hooker and one retaining slot are applied for the engagement therebetween the disks and the connecting shaft. As a result, only a single operator is required to conveniently facilitate the assembling work. A great deal of manual labor and assembling time can be reduced.

In order to achieve these objectives, the disk is provided with a plurality of recessed portions that are circumferentially arranged on one surface while the other surface is formed with a plurality of embossed portions corresponding to those recessed portions. Each recessed portion is provided with a through hole that passes through the embossed portion. The bottom of the recessed portion is provided with a retaining groove that passes through the recessed portion. The end surface of the connecting shaft is also provided with a plurality of dowel inserts that are arranged circumferentially. One of the dowel inserts is provided with a ratchet hooker that can be inserted into a recessed portion completely after it passes through the through hole and rotated about a given angle. Consequently, the ratchet hooker can be firmly engaged with the retaining slot. The engagement therebetween is firm and durable.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

Figure 1:
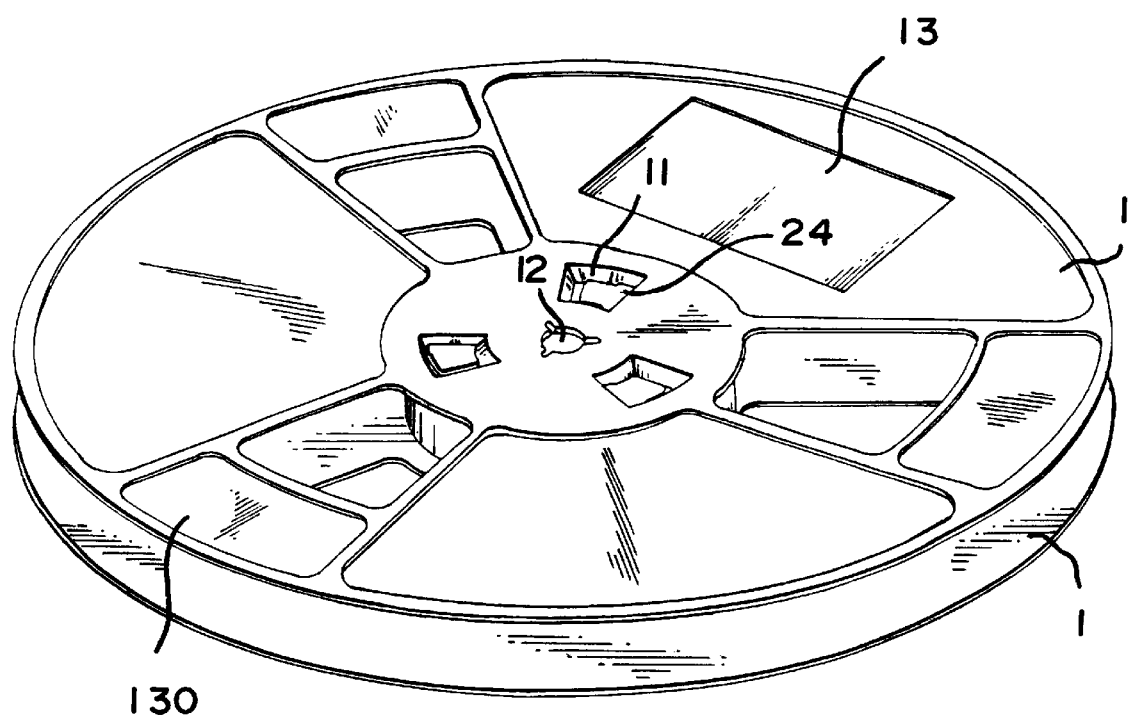
FIG. 1 is an exploded view of the winding reel made according to the present invention.
Figure 2:
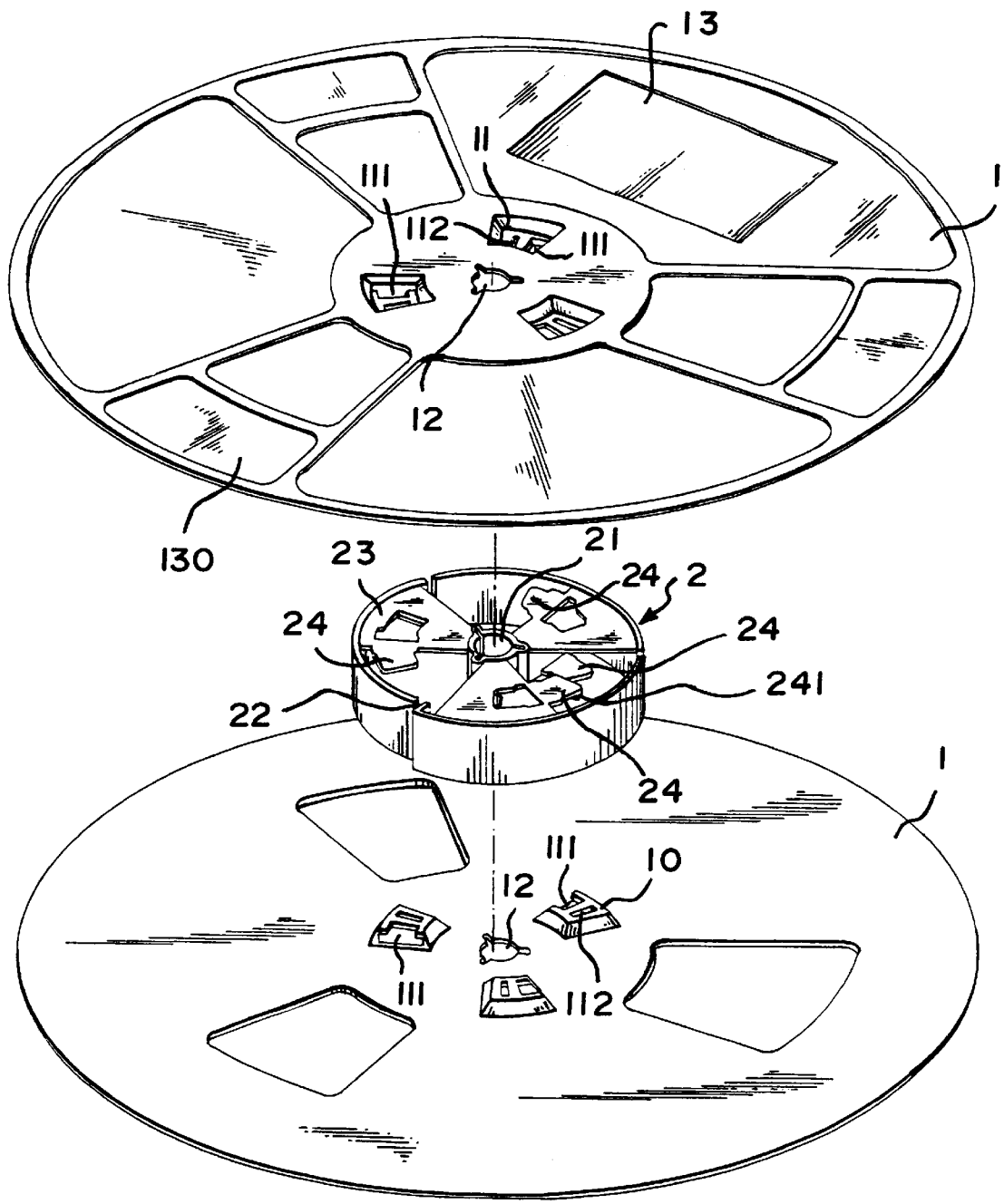
FIG. 2 is a perspective view of the assembled winding reel shown in FIG. 1.

Referring to FIG. 1, the winding reel assembly made according to the present invention generally comprises a pair of disks 1 and a connecting shaft 2. Each disk 1 is provided with a central hole 12 centrally. The disk 1 is further provided with a plurality of recessed portions 11 that are adjacent to the hole 12 and are arranged circumferentially. Those recessed portions 11 are then formed with a plurality of raised or embossed portions 10 on the opposite surface of disk 1. Each side of embossed portion 10 facing the same direction is provided with a through hole 111. The bottom portion of each recessed portion 11 is provided with a retaining slot 112. The surface of the disk 1 is further provided with a plurality of recesses 13 and 130 that have different dimensions for receiving stickers therein.

The connecting shaft 2 is provided with a winding slot 22 in the outer surface in which the end of the component strip (not shown) can be inserted for further winding process. The connecting shaft 2 includes a central passage 21 and a plurality of radially extending cantilever plates defining a plurality of dowel inserts 23 on the end surface thereof. Those dowel inserts 23 are spaced circumferentially. In the preferred embodiment, the dowel inserts 23 each have a sector shape. A connecting insert 24 that can be inserted into the through hole 111 is disposed on each dowel insert 23 and facing the same direction. In the preferred embodiment, the end portion of one connecting insert 24 is provided with a ratchet hooker 241.

Figure 3:
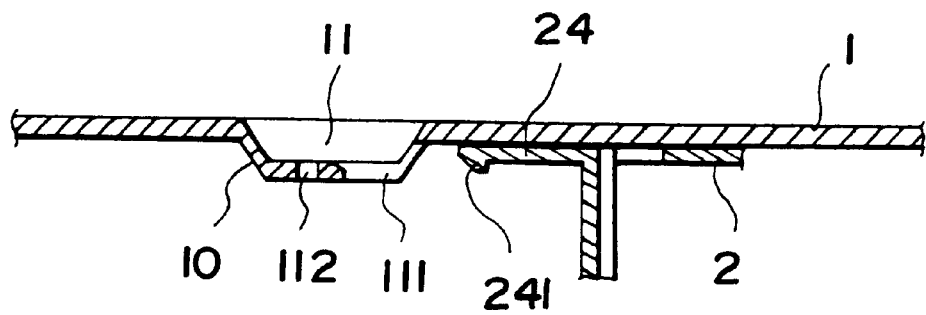
FIG. 3 is a partial, cross sectional view showing the disk and the connecting shaft are not yet engaged with each other.
Figure 4:
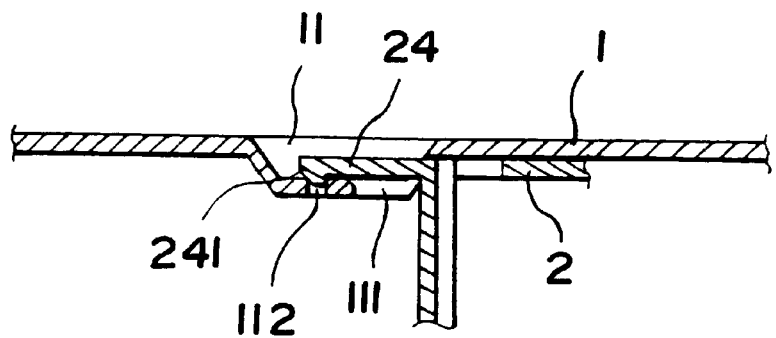
FIG. 4 is a partial, cross sectional view showing the disk and the connecting shaft are engaged with each other.

Referring to FIGS. 1, 3 and 4, in assembling, the embossed portions 10 of the disk 1 are firstly aligned with the spaces between dowel inserts 23 at the end surface of the connecting shaft 2 such that the connecting inserts 24 can be inserted into the embossed portions 10 through the through holes 111 after the disk 1 is rotated respect to the connecting shaft 2. Accordingly, the ratchet hooker 241 of the connecting insert 24 can be snap-fitted within the retaining slot 112. On the other hand, when the disk 1 and the connecting shaft 2 are assembled, the central hole 12 of the disk 1 and the central passage 21 of the connecting shaft 2 are aligned with each other. As a result, a supporting rod (not shown) can be inserted therethrough and the winding reel assembly can readily rotate with respect to the supporting rod.

By this arrangement, even though the winding assembly mass unfortunately be dropped to the floor, the engagement between the disks 1 and the connecting shaft 2 will not be broken such that the component roll wound therein will not be scattered around and remain intact. Furthermore, since only one connecting insert 24 is provided with a ratchet hooker 241 that is used to engage with the connecting shaft 2, accordingly, only one operator is required to conduct the assembling job. With a simple rotational movement, the engagement between the connecting insert 24 and the through hole 111 can be reversed. As a result, the disks 1 and the connecting shaft 2 can be easily disassembled.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:
1. The winding reel assembly comprising:
   a) a pair of disks and a connecting shaft for securing the disks together and defining a storage space therebetween for winding a component strip;
   b) each disk including a first surface having a plurality of circumferentially spaced recessed portions formed therein, each recessed portion having a corresponding embossed portion extending from a second opposite surface of the disk;
   c) each embossed portion including a side having a through hole formed therein, with all the through holes facing a same circumferential direction, and a bottom portion having a slot formed therein;
   d) the connecting shaft having a pair of end faces, each end face including a plurality of circumferentially spaced dowel inserts and a plurality of spaces therebetween, each dowel insert further having a connecting insert, with all the connecting inserts facing a same circumferential direction, and at least one connecting insert being provided with a ratchet hooker thereon; and
   e) wherein each disk is detachably secured to an end face of the connecting shaft by engaging the second surface of the disk against the end face of the shaft to dispose the embossed portions through the spaces between the dowel inserts and positioning the connecting inserts adjacent the through holes of the embossed portions so that rotation of the disk relative to the shaft causes engagement of the connecting inserts within the through holes of the embossed portions and the at least one ratchet hooker in the slot within which the corresponding connecting insert is engaged.

* * * * *